(12) United States Patent
Huang

(10) Patent No.: US 6,205,806 B1
(45) Date of Patent: Mar. 27, 2001

(54) ICE CREAM MAKING APPARATUS AND AN AGITATOR FOR THE SAME

(76) Inventor: Olivia Huang, No. 2, Lane 403, Sec. 3, Chung-Shan Rd., Wu-Jih Hsiang, Taichung Hsien (TW)

( * ) Notice: Subject to any disclaimer, the term of this patent is extended or adjusted under 35 U.S.C. 154(b) by 0 days.

(21) Appl. No.: 09/405,574

(22) Filed: Sep. 27, 1999

(51) Int. Cl.⁷ ..................................................... A23G 9/00
(52) U.S. Cl. ............................................. 62/343; 366/309
(58) Field of Search ..................... 62/342, 343; 366/144, 366/309, 325.7, 325.8

(56) References Cited

U.S. PATENT DOCUMENTS

| | | | |
|---|---|---|---|
| 1,039,779 | * | 10/1912 | Miles .................................... 366/309 |
| 2,784,951 | * | 3/1957 | Bakewell ............................. 366/309 |
| 2,924,952 | * | 2/1960 | Swenson et al. ...................... 62/342 |
| 4,429,549 | * | 2/1984 | Randolphi ............................. 62/342 |
| 4,796,440 | * | 1/1989 | Shiotani et al. ....................... 62/344 |
| 4,910,973 | * | 3/1990 | Osrow et al. .......................... 62/344 |
| 5,890,804 | * | 4/1999 | Edwards et al. ..................... 366/309 |

\* cited by examiner

*Primary Examiner*—Corrine McDermott
*Assistant Examiner*—Mohammad M Ali
(74) *Attorney, Agent, or Firm*—Trop, Pruner & Hu, P.C

(57) ABSTRACT

An ice cream making apparatus and an agitator for the same. The agitator includes top and bottom ends, and a shaft defining an axis through top and bottom ends thereof. A pair of first left and right arms are mounted on the shaft adjacent to the top end. A pair of second left and right arms are mounted on the shaft adjacent to the bottom end. A first left wing extends downwardly from a bottom side of the second left arm in a direction substantially parallel to the axis, and a first right wing extends downwardly from a bottom side of the second right arm, and is inclined at an angle relative to the axis. Diametrically opposed third left and right arms interconnect the first and second left arms and the first and second right arms, respectively. A pair of second left and right wings extend inclinedly from the third left and right arms, respectively.

6 Claims, 3 Drawing Sheets

ICE CREAM MAKING APPARATUS AND AN AGITATOR FOR THE SAME

BACKGROUND OF THE INVENTION

1. Field of the Invention

This invention relates to an ice cream making apparatus and an agitator for the same, more particularly to an household ice cream making apparatus and an agitator for the same.

2. Description of the Related Art

FIG. 1 illustrates a conventional ice cream making apparatus. The apparatus includes a stand 11, a container 13 mounted on the stand 11, an agitator 15 disposed inside the container 13, a driving unit 14 connected to the agitator 15, and a cover 12 covering the top of the container 13. The agitator 15 includes a shaft 151, a spiral-shaped blade 153 mounted on the shaft 151, an L-shaped blade 152 mounted on the shaft 151 and the spiral-shaped blade 153, and an extruding screw portion 155 extending downward from the shaft 151. The screw portion 155 extends through the bottom of the container 13 so as to extrude the ice cream out from the container 13.

While the above described agitator 15 can be used in an ice cream making apparatus, its mixing effect is unsatisfactory as the quality of the resulting ice cream is relative poor.

SUMMARY OF THE INVENTION

Therefore, it is an object of the present invention to provide an agitator for an ice cream making apparatus that is capable of providing an excellent mixing effect for producing good quality ice cream.

According to one aspect of this invention, an agitator for an ice cream making apparatus of this invention comprises: a shaft having opposing top and bottom ends, and defining an axis that extends through the top and bottom ends; first left and right arms mounted on the shaft adjacent to and below the top end of the shaft, the first left and right arms extending radially and oppositely from the shaft, and having first left and right ends distal from the shaft, respectively; second left and right arms mounted on the shaft adjacent to and above the bottom end of the shaft, the second left and right arms extending radially and oppositely from the shaft and being aligned with the first left and right arms, respectively, the second left and right arms having second left and right ends aligned with the first left and right ends, respectively; a first left wing extending downwardly from a bottom side of the second left arm in a direction substantially parallel to the axis, and a first right wing extending downwardly from a bottom side of the second right arm and inclined at an angle relative to the axis; diametrically opposed third left and right arms interconnecting the first and second left ends and the first and second right ends, respectively; and second left and right wings extending inclinedly from the third left and right arms, respectively.

According to another aspect of this invention, an agitator for an ice cream making apparatus of this invention comprises: a stand; a container mounted on the stand; a cover mounted on the container; a shaft disposed inside the container, the shaft having opposing top and bottom ends, and defining an axis that extends through the top and bottom ends; an extruding screw portion coaxial with the shaft and extending downwardly from the bottom end of the shaft through the container; first left and right arms mounted on the shaft adjacent to and below the top end of the shaft, the first left and right arms extending radially and oppositely from the shaft, and having first left and right ends distal from the shaft, respectively; second left and right arms mounted on the shaft adjacent to and above the bottom end of the shaft, the second left and right arms extending radially and oppositely from the shaft and being aligned with the first left and right arms, respectively, the second left and right arms having second left and right ends aligned with the first left and right ends, respectively; a first left wing extending downwardly from a bottom side of the second left arm in a direction substantially parallel to the axis, and a first right wing extending downwardly from a bottom side of the second right arm and inclined at an angle relative to the axis; diametrically opposed third left and right arms interconnecting the first and second left ends and the first and second right ends, respectively; second left and right wings extending inclinedly from the third left and right arms, respectively; and a driving unit mounted on the stand and connected to the shaft for rotating the shaft and the extruding portion about the axis.

BRIEF DESCRIPTION OF THE DRAWINGS

In drawings which illustrate an embodiment of the invention.

DETAILED DESCRIPTION OF THE PREFERRED EMBODIMENT

Figure 1:
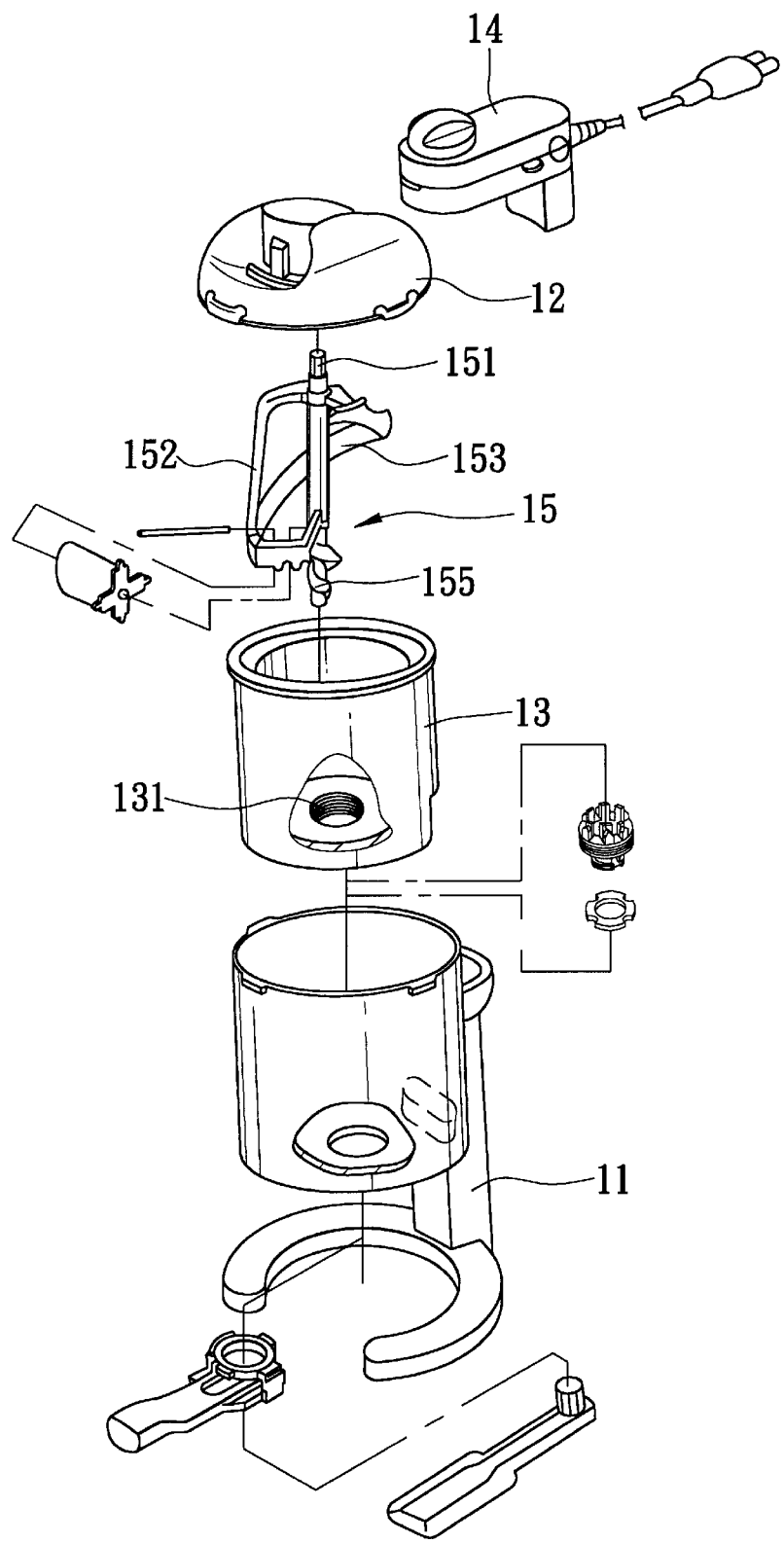
FIG. 1 is an exploded view of a conventional agitator for an ice cream making apparatus.
Figure 2:
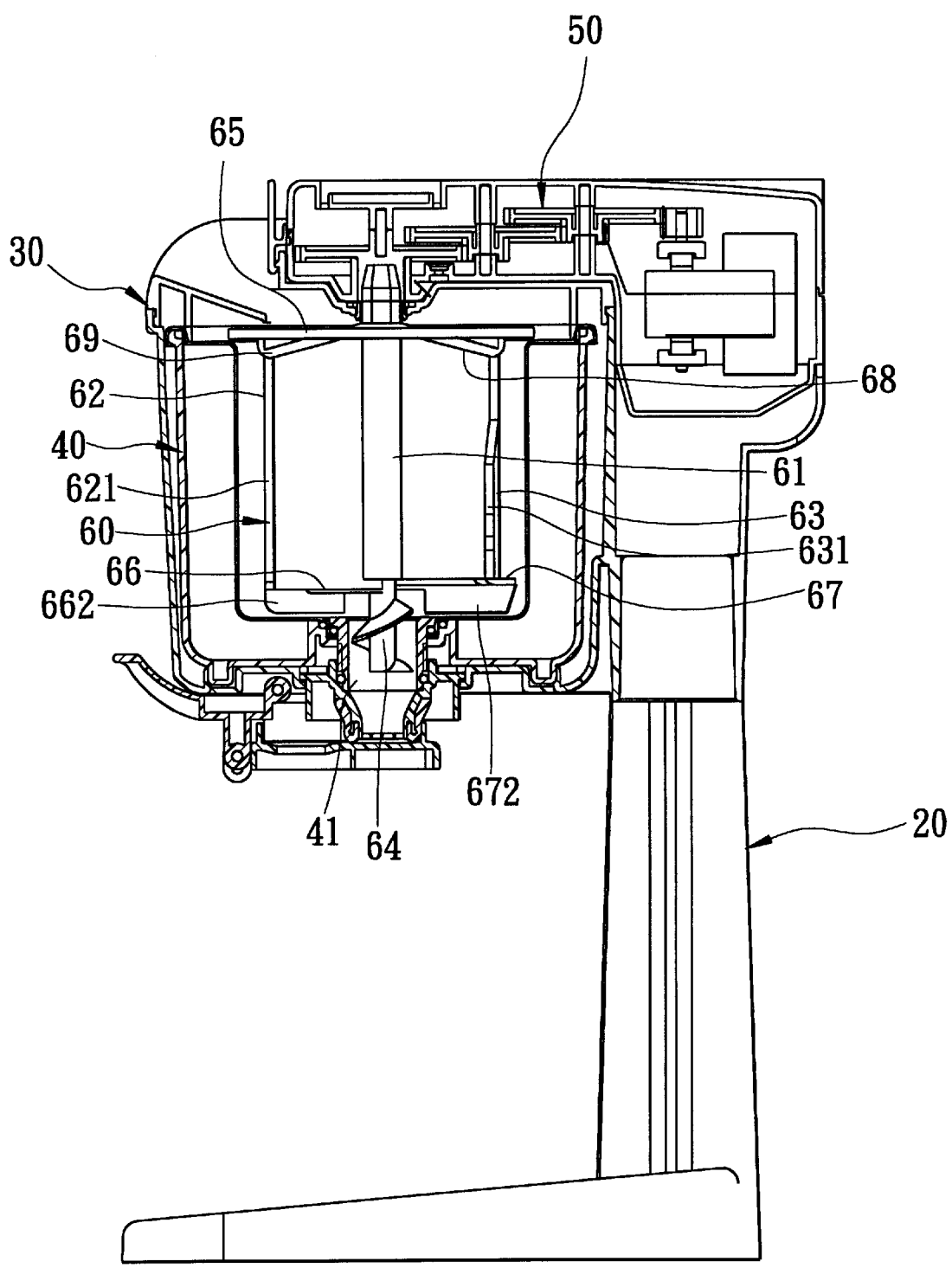
FIG. 2 is a cross-sectional side view of an agitator installed in an ice cream making apparatus embodying this invention.

FIG. 2 illustrates an ice cream making apparatus embodying this invention. The ice cream making apparatus of this invention includes a stand 20, a container 40 mounted on the stand 20, an agitator 60 disposed inside the container 40, a cover 30 covering the top of the container 40, and a driving unit 50 mounted on the stand 20 and connected to the agitator 60. The container 40 has a bottom outlet 41.

Figure 3:
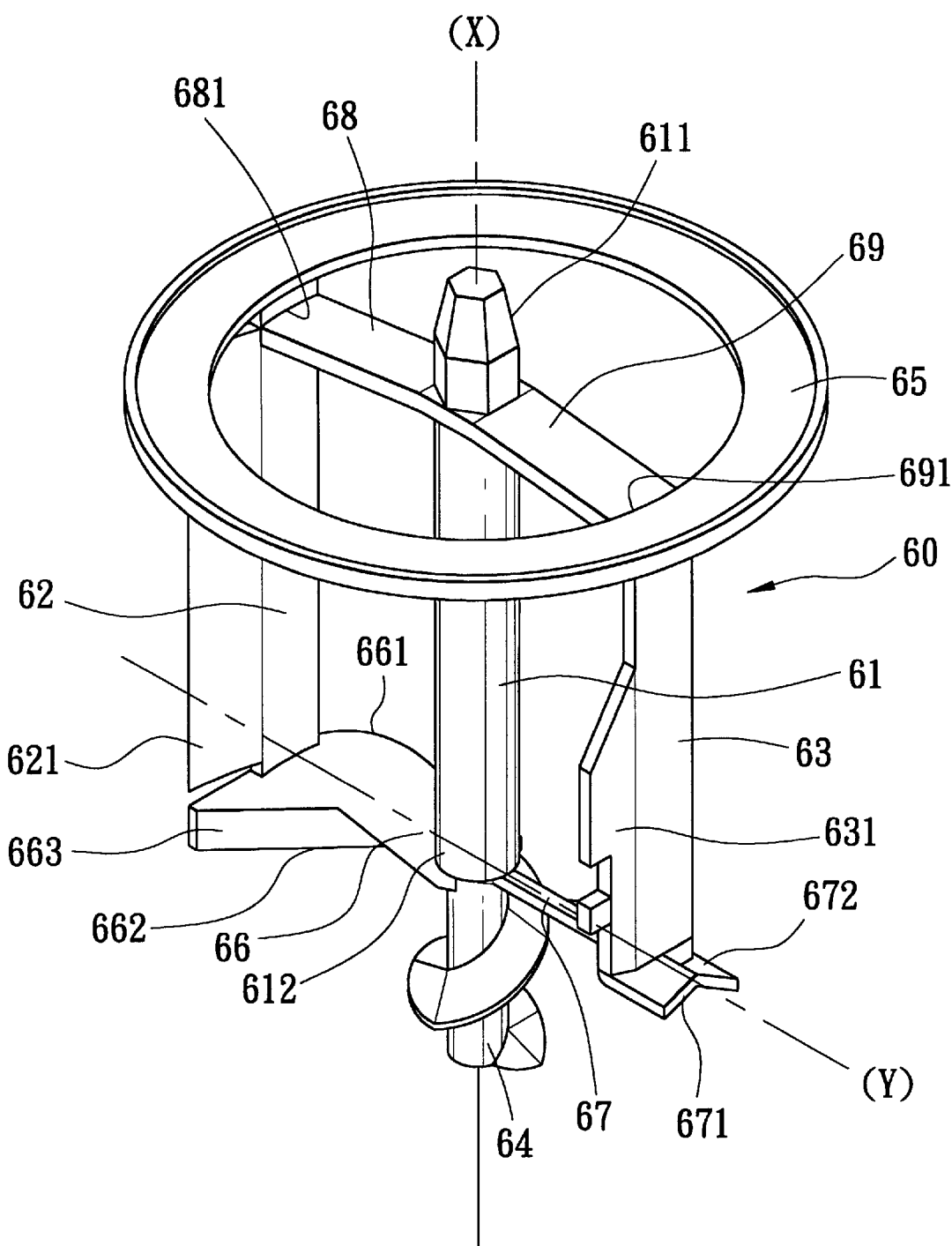
FIG. 3 is a perspective view of the agitator of FIG. 2.

Referring now to FIG. 3 in combination with FIG. 2, the agitator 60 of this invention includes a shaft 61 having opposing top and bottom ends 611, 612, and defining an axis (X) that extends through the top and bottom ends 611, 612.

A pair of first left and right arms 68, 69 are mounted on the shaft 61 adjacent to and below the top end 611 of the shaft 61, extend radially and oppositely from the shaft 61, and have first left and right ends 681, 691 distal from the shaft 61, respectively.

A pair of second left and right arms 66, 67 are mounted on the shaft 61 adjacent to and above the bottom end 612 of the shaft 61, extend radially and oppositely from the shaft 61 so as to be aligned with the first left and right arms 68, 69, and have second left and right ends 661, 671 aligned with the first left and right ends 681, 691, respectively. The second left arm 66 has a width greater than that of the second right arm 67. The second left end 661 of the second left arm 66 is curved away from the shaft 61.

A first left wing 662 extends downwardly from a bottom side of the second left arm 66 in a direction substantially parallel to the axis (X). A first right wing 672 extends downwardly from a bottom side of the second right arm 67, and is inclined at an angle relative to the axis (X). The first left wing 662 has a curved portion 663 extending along the curvature of the second left end 661 of the second left arm 66. The first right wing 672 is flat, and is substantially rectangular in shape.

A pair of diametrically opposed third left and right arms 62, 63 interconnect respectively the first and second left ends 681, 661 and the first and second right ends 691, 671, and are substantially parallel to the axis (X).

A pair of second left and right wings 621, 631 extend inclinedly from the third left and right arms 62, 63, respectively, and are disposed on the same side of a diametral line (Y) which passes through the second left and right arms 66, 67. The second left wing 621 is inclined from the third left arm 62 away from the shaft 61. The second right wing 631 is inclined from the third right arm 63 toward the shaft 61. The second left and right wings 621, 631 extend substantially parallel to each other.

An annular arm 65 is disposed around the top end 611 of the shaft 61, and is connected to the first left and right ends 681, 691 of the first left and right arms 68, 69.

An extruding screw portion 164 is coaxial with the shaft 61, and extends downwardly from the bottom end 612 of the shaft 61 through the bottom outlet 41 of the container 40 so as to extrude the ice cream out of the container 40 via the bottom outlet 41.

The arrangement of the first left wing 662 of the agitator 60 of the present invention can provide radial flow for the ice cream, while the first right wing 672 and the second left and right wings 621, 631 can provide axial flow and circular flow around the shaft 61 for the ice cream, respectively, when the agitator rotates. Such flows produce high turbulence for the ice cream, thereby enhancing the mixing effect of the ice cream. Moreover, the second left wing 621 extends to a position close to the inner wall of the container 40 so as to avoid coherent lumps of the ice cream near the inner wall of the container 40. The arrangement of the annular arm 65 and the first left and right arms 68, 69 can prevent the ice cream from overflowing from the top of the container 40, which may occur due to the expansion of the ice cream during the mixing, and can provide a compressing effect on the ice cream so that dense ice cream can be obtained.

With the invention thus explained, it is apparent that various modifications and variations can be made without departing from the spirit of the present invention. It is therefore intended that the invention be limited only as recited in the appended

I claim:

1. An agitator adapted for an ice cream making apparatus, comprising:

a shaft having opposing top and bottom ends, and defining an axis that extends through said top and bottom ends;

first left and right arms mounted on said shaft adjacent to and below said top end of said shaft, said first left and right arms extending radially and oppositely from said shaft, and having first left and right ends distal from said shaft, respectively;

second left and right arms mounted on said shaft adjacent to and above said bottom end of said shaft, said second left and right arms extending radially and oppositely from said shaft and being aligned with said first left and right arms, respectively, said second left and right arms having second left and right ends aligned with said first left and right ends, respectively;

a first left wing extending downwardly from a bottom side of said second left arm in a direction substantially parallel to said axis, and a first right wing extending downwardly from a bottom side of said second right arm and inclined at an angle relative to said axis;

diametrically opposed third left and right arms interconnecting said first and second left ends and said first and second rights ends, respectively, said third left and right arms are substantially parallel to said axis; and second left and right wings extending inclinedly from said third left and right arms, respectively, said second left and right wings are disposed on the same side of a diametral line passing through said left and right arms.

2. The agitator of claim 1, wherein said second left wing inclines from said third left arm away from said shaft, and said second right wing inclines from said third right arm toward said shaft.

3. The agitator of claim 2, wherein said second left and right wings extend substantially parallel to each other.

4. The agitator of claim 3, wherein said second left arm has a width greater than that of said second right arm.

5. The agitator of claim 4, wherein said second left end of said second left arm is curved away from said shaft.

6. The agitator of claim 5, wherein said first left wing has a curved portion extending along the curvature of said second left end of said second left arm, and said first right wing is substantially rectangular in shape.

\* \* \* \* \*